(12) United States Patent  (10) Patent No.: US 9,194,694 B2
Goodwin  (45) Date of Patent: Nov. 24, 2015

(54) INTERFEROMETER DEVICES FOR DETERMINING INITIAL POSITION OF A STAGE OR THE LIKE

(71) Applicant: Nikon Corporation, Chiyoda-ku (JP)

(72) Inventor: Eric Peter Goodwin, Tucson, AZ (US)

(73) Assignee: Nikon Corporation, Tokyo (JP)

( * ) Notice: Subject to any disclaimer, the term of this patent is extended or adjusted under 35 U.S.C. 154(b) by 218 days.

(21) Appl. No.: 13/753,841

(22) Filed: Jan. 30, 2013

(65) Prior Publication Data

US 2013/0194583 A1    Aug. 1, 2013

Related U.S. Application Data

(60) Provisional application No. 61/592,990, filed on Jan. 31, 2012.

(51) Int. Cl.
  G01B 11/02  (2006.01)
  G01B 11/14  (2006.01)
  G01B 9/02   (2006.01)

(52) U.S. Cl.
  CPC ............ *G01B 11/14* (2013.01); *G01B 9/02018* (2013.01)

(58) Field of Classification Search
  CPC ............................. G01B 11/14; G01B 9/02018
  USPC ......................................................... 356/498
  See application file for complete search history.

(56) References Cited

U.S. PATENT DOCUMENTS

| | | | |
|---|---|---|---|
| 2002/0085208 A1* | 7/2002 | Hauger et al. | 356/479 |
| 2003/0007156 A1* | 1/2003 | De Groot et al. | 356/487 |
| 2003/0038947 A1* | 2/2003 | Hill | 356/493 |
| 2003/0053079 A1* | 3/2003 | Hill | 356/520 |
| 2003/0095265 A1* | 5/2003 | Hill | 356/493 |
| 2003/0128369 A1* | 7/2003 | Hill | 356/517 |
| 2003/0197869 A1* | 10/2003 | Johnstone et al. | 356/493 |
| 2003/0197870 A1* | 10/2003 | Bagwell et al. | 356/493 |
| 2006/0098210 A1* | 5/2006 | Freimann et al. | 356/521 |
| 2006/0176490 A1* | 8/2006 | Suzuki et al. | 356/479 |
| 2007/0024863 A1* | 2/2007 | Kadowaki et al. | 356/498 |
| 2007/0171425 A1* | 7/2007 | De Groot et al. | 356/478 |

\* cited by examiner

*Primary Examiner* — Tarifur Chowdhury
*Assistant Examiner* — Jonathon Cook
(74) *Attorney, Agent, or Firm* — Klarquist Sparkman, LLP

(57) ABSTRACT

An exemplary device has a stationary portion and a movable portion. The stationary portion has a first corner-cube, an optical system including a beamsplitter, and a light detector. The movable portion comprises a second corner-cube mountable on an object that is displaceable in a principal direction relative to the stationary portion. The beamsplitter splits a beam of collimated broadband light into a reference beam and a measurement beam that are directed by the optical system to make multiple roundtrip passes from the optical system to the respective corner cubes and back. The reference beam and measurement beam interfere with each other to produce a coherence envelope sensed by the detector, wherein a detected displacement of the coherence envelope corresponds to a respective position of the object in the principal direction.

35 Claims, 13 Drawing Sheets

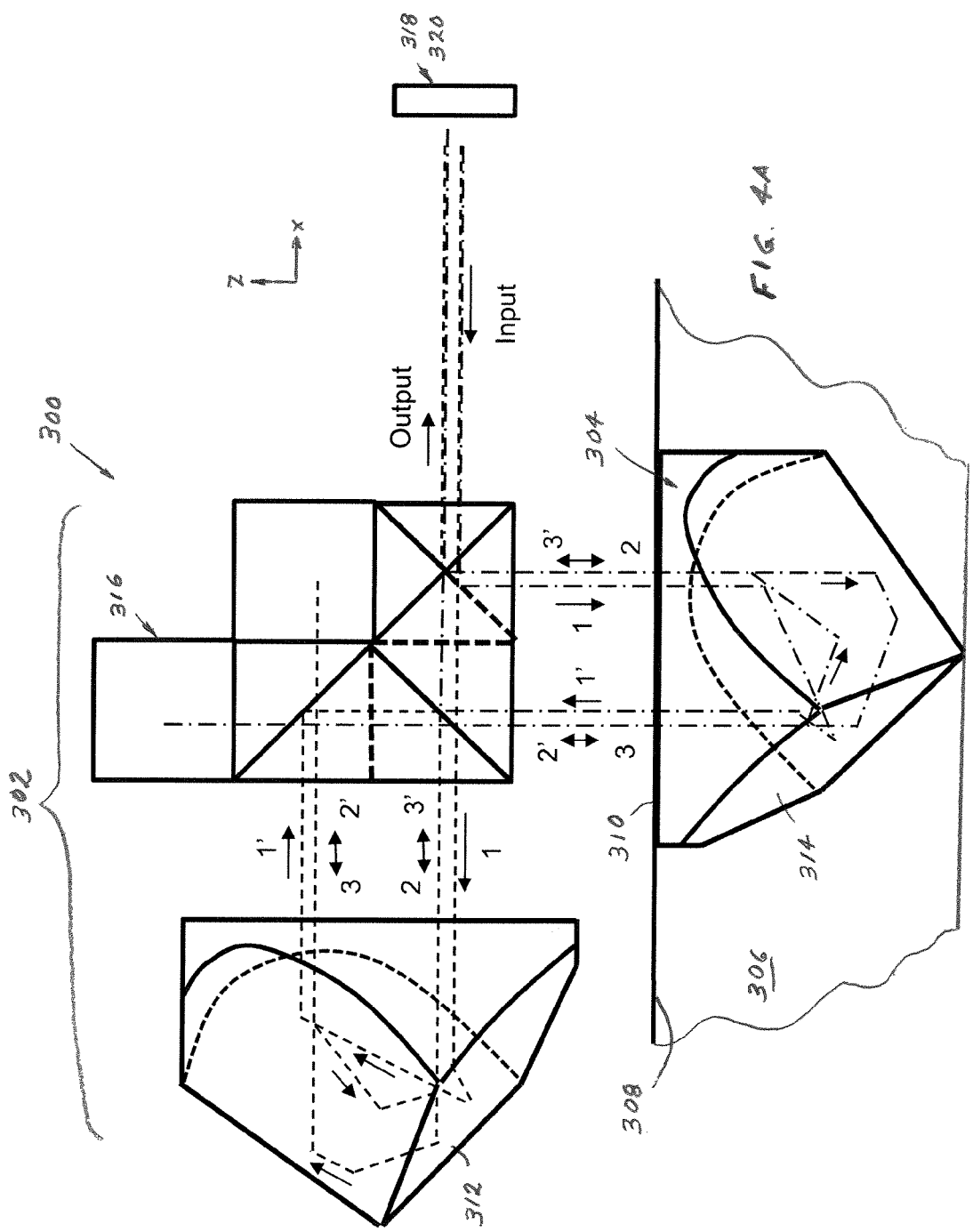

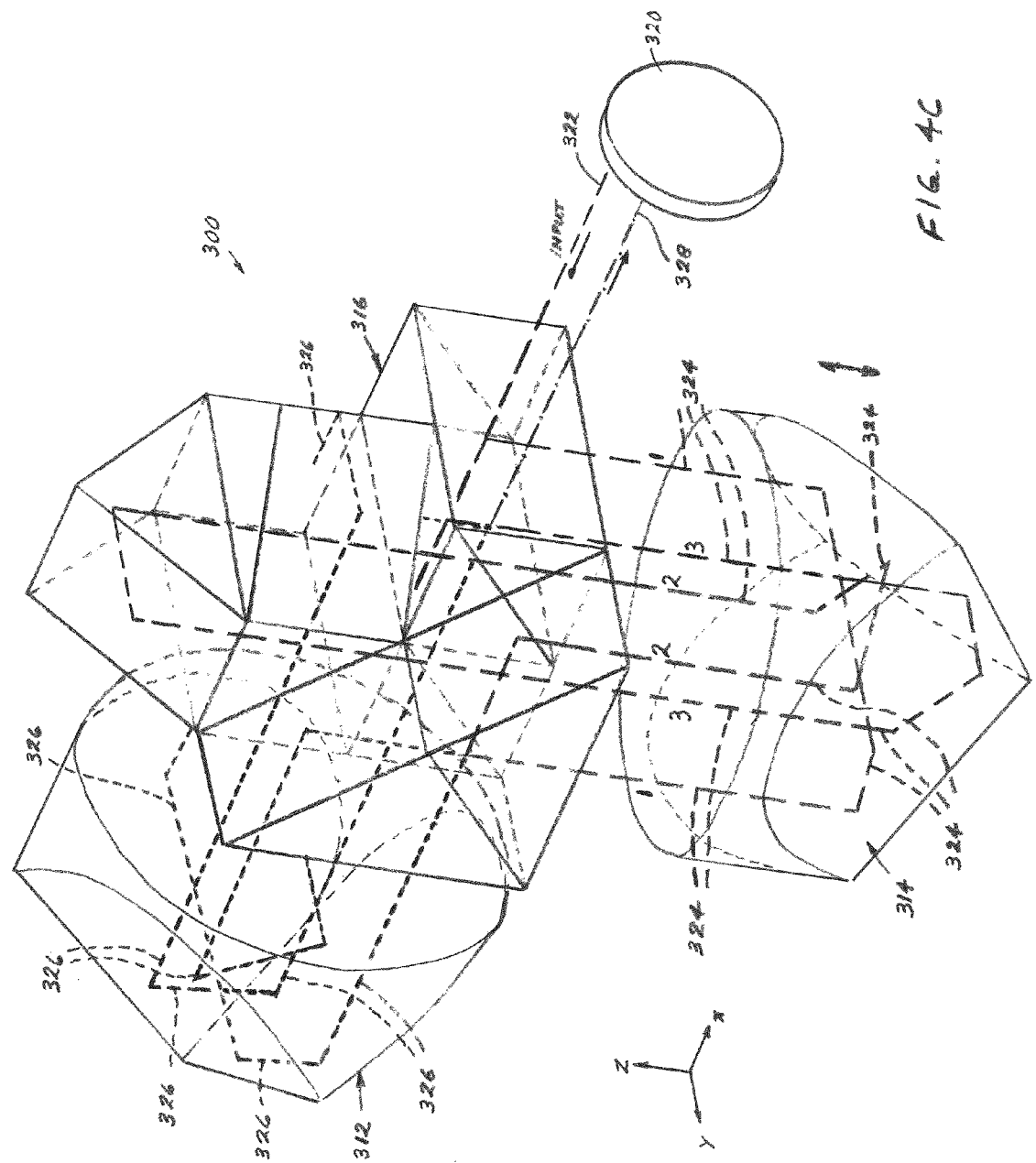

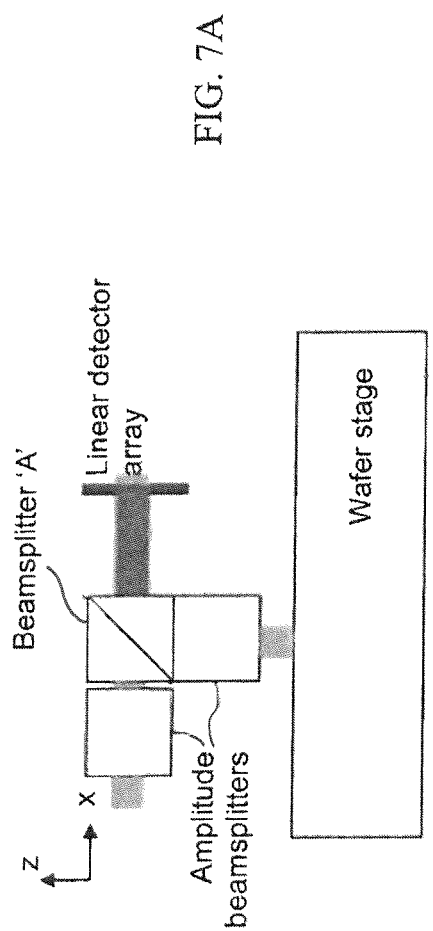
FIG. 7A
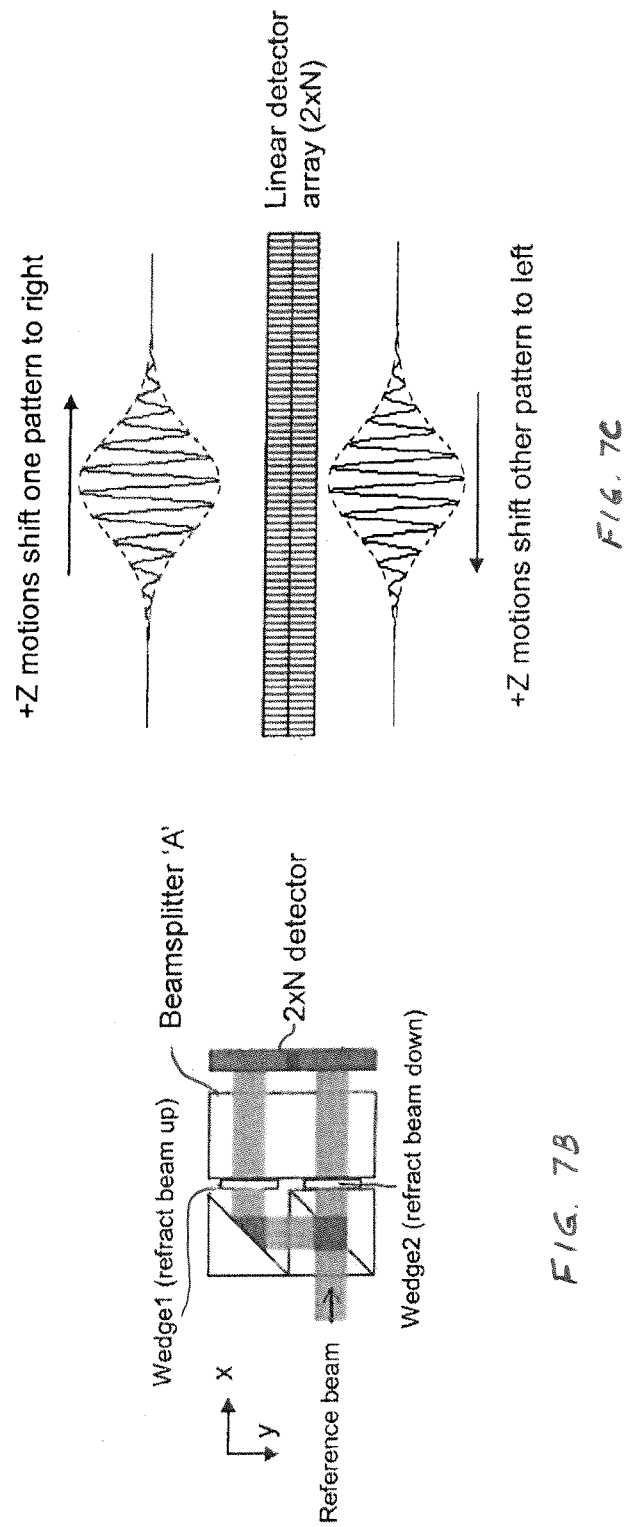
FIG. 7B
FIG. 7C

INTERFEROMETER DEVICES FOR DETERMINING INITIAL POSITION OF A STAGE OR THE LIKE

CROSS-REFERENCE TO RELATED APPLICATION

This application claims priority to, and the benefit of, U.S. Provisional Application No. 61/592,990, filed on Jan. 31, 2012, which is incorporated herein by reference in its entirety.

FIELD

This disclosure pertains to, inter alia, interferometric sensors used for determining a position, on an axis, of a stage or analogous device, particularly at startup of a system comprising the stage.

BACKGROUND

Various types of exposure systems are currently in use for imprinting micro-patterns onto the surfaces of substrates such as semiconductor wafers. A typical exposure system includes an illumination source, a first stage apparatus that holds and positions a pattern master (e.g., a reticle), a second stage apparatus (downstream of the first stage apparatus) that holds and positions the substrate, a projection-optical subsystem situated between the first and second stage apparatus, and a control subsystem connected to and exercising operational control over these apparatus and subsystems. Since the sizes of the elements of the exposed pattern are very small (currently in the several tens of nanometers), the first and second stage apparatus must be capable, as controlled by the control subsystem, of achieving extremely accurate and precise positioning of the stage apparatus and projection-exposure system relative to each other so as to achieve corresponding accuracy of exposure.

Substantially all exposure systems currently in use employ various sensors, detectors, and other measurement devices for determining and monitoring the accuracy and precision of stage position and of many other operations performed by the exposure system. For example, interferometers are widely used for sensing position of the wafer stage (also called substrate stage) during use of the system for making exposures. Other position-measuring devices in current use utilize motion encoders. During operation of the exposure system, these sensing devices collectively determine stage position in various degrees of freedom at very high accuracy and precision. These measurements are used in various ways, such as to "servo" stage motion and to provide stage positioning as required for accurate and precise exposures.

Measurements of position of the substrate stage obtained during system operation are typically relative measurements. Provision of reference data for a stage-position measurement is facilitated by the fact that, in any moment of time during operation, the system already "knows" the location of the stage. But, there are certain instances in which providing a reference location for stage location can be more difficult. An exemplary instance is during start-up of the exposure system.

Whenever an exposure system is started up, something usually must be done to "initialize" stage positions, i.e., determine an initial stage position relative to the projection-optical system to provide a baseline(s) for subsequent positioning movements and measurements of or involving the stage. This initialization requirement can apply to one or both stages in a microlithography system. Some conventional systems execute a start-up routine in which the stage is momentarily moved to a starting, or initialization, position at which starting-position data are obtained. Unfortunately, this routine consumes valuable time.

Position sensors used for determining the starting position of a stage may not be the same as the stage-position sensors used during system operation. Sensors used at startup, particularly those not requiring return of the stage to an initialization position, desirably provide absolute position data rather than relative position data. For example, for determining stage height during system operation, a monochromatic interferometer provides a relative measurement. Since phase is measured modulo $2\pi$ in phase, one interference fringe is indistinguishable from the next. This normally does not cause a problem during normal system operation but can pose a problem during system startup because an indistinguishable interference fringe does not provide a position reference. A similar difficulty exists with encoder-reading heads that operate using light diffracted from a grating on the stage; these devices are also, in effect, interferometers.

Another challenge posed particularly to an interferometric sensor for determining initial stage z-position is the possibility that the stage may not be, at startup, exactly perpendicular to the measurement beam of the interferometer. I.e., the stage may be exhibiting tip and/or tilt ($\theta_x$, $\theta_y$). This lack of perpendicularity can introduce significant error into the z-position determination.

Therefore, there is a need for accurate interferometric sensors useful for accurately determining stage position (e.g., stage "height" or z-position) as required, e.g., upon system startup, even in situations in which the measurement beam of the sensor is not exactly perpendicular to the stage.

SUMMARY

The needs discussed above are addressed by, inter alia, a position-measurement device, of which an exemplary embodiment comprises a stationary portion and a movable portion. The stationary portion, comprises a first corner-cube, an optical system including a beamsplitter, and a light detector. The movable portion comprises a second corner-cube mountable on an object that is displaceable in a direction (e.g., a z-direction) relative to the first portion. The beamsplitter splits a beam of collimated broadband light (e.g., center wavelength of 600 nm and a FWHM of 300 nm) into a reference beam and a measurement beam that are directed by the optical system to make multiple roundtrip passes from the optical system to the respective corner cubes and back. Before reaching the detector, the reference beam and measurement beam interfere with each other to produce a coherence envelope that is sensed by the detector, wherein a detected displacement of the coherence envelope corresponds to a respective detected position of the object. Similarly, a change in position of the object produces a corresponding change in position of the coherence envelope (especially of an irradiation maximum of the coherence envelope) as detected by the detector.

The device can include a source of the beam of collimated broadband light or alternatively receive and utilize a beam of such light from a remote source. In the first instance the source can be mounted to the first portion. In the second instance the source is situated remotely from the first portion and optically connected to the first portion via a light conduit (e.g., optical fiber).

In many embodiments the optical system directs the reference beam to make multiple roundtrip passes in a first orthogonal direction. The optical system also directs the measurement beam to make multiple roundtrip passes in a second orthogonal direction normal to the first orthogonal direction, wherein the object is displaceable in the second orthogonal direction. In one reference frame, the first orthogonal direction is an x- or y-direction, while the second orthogonal direction is a z-direction. In any event, the detected position of the coherence envelope corresponds to a measurement of position of the object in the second orthogonal direction.

The reference and measurement beams desirably produce the coherence envelope by low-coherence interference, which is facilitated by the broadband characteristic of the light used for the reference and measurement beams.

The reference and measurement beams each make at least one round trip and desirably make multiple (at least two) round trips, wherein a "round trip" is a journey from the optical system to the respective corner cube and back to the optical system. By way of example, and reflecting certain practical constraints, these beams each make three roundtrips to and from the first and second corner-cubes, respectively.

The reference beam desirably is normally (perpendicularly) incident on the input/output surface (usually a circular surface) of the first corner-cube, and the measurement beam desirably is normally (perpendicularly) incident on the input/output surface of the second corner-cube. (Exact perpendicularity is not required.) The beams enter and leave the input/output surfaces of the respective corner-cubes at different respective locations to keep the beams propagating in the corner cubes separate from each other. Desirably, the corner-cubes are of similar size and similar material to provide the reference and measurement beams with equal glass and air paths.

A typical profile of the coherence envelope is Gaussian. With this and other profiles, the detector senses position of the object by determining position of a "peak" (irradiance maximum) of the coherence envelope.

In some embodiments the optical system can further comprise at least one beam-tilting optical element (e.g., a wedge) located to impose a tilt to the reference beam relative to the measurement beam before the beams are recombined. The tilt desirably is small, e.g., no greater than 1°. In other embodiments, respective tilts are imposed, by respective beam-tilting optical elements, to both the reference and measurement beams before the beams are recombined for interference.

In many embodiments the detector comprises a linear (one-dimensional) array of detector elements. The detector can have as few as one element, which requires that detection of interference of the beams be performed in a scanning manner. Alternatively, and more desirably, the detector can have a two-dimensional (planar) array of detector elements.

In certain embodiments the light source includes a chromatic filter for adjusting the bandwidth of light from the source. The chromatic filter can be mounted to be inserted into and retracted from the beam produced by the source to change the dynamic range of the beam as desired.

In some embodiments the optical system further comprises a respective amplitude beamsplitter for each of the reference and measurement beams returning to the optical system for recombination, wherein each beamsplitter splits the respective beam into respective first and second portions. In these and other embodiments, the optical system can further comprise first and second wedges situated to refract (tilt) the first portion of the reference beam in a first direction and to refract (tilt) the second portion of the reference beam in a second direction opposite the first direction.

This disclosure is also directed to interferometer devices of which a representative embodiment comprises a stationary portion comprising a first corner-cube, an optical system including a beamsplitter, and a light detector, as well as a movable portion comprising a second corner-cube mountable on an object that is displaceable in a direction relative to the first portion. The beamsplitter splits a beam of collimated broadband light from a source into a reference beam and a measurement beam that are directed by the optical system to make multiple roundtrip passes from the optical system to the respective corner cubes and back. The beams interfere with each other to produce a coherence envelope sensed by the detector, wherein a detected position of the coherence envelope corresponds to a respective position of the object.

This disclosure is also directed to precision systems of which a representative embodiment comprises a workpiece holder (e.g., a stage) that is movable in at least one movement direction, and at least one position-measurement device as summarized herein. A detected position of the coherence envelope corresponds to a respective position of the holder. Desirably, the measurement beam makes multiple roundtrip passes in the movement direction, while the reference beam makes corresponding multiple roundtrip passes in a direction orthogonal to the principal direction.

The precision system can comprise, for each movable holder of the system, at least three position-measurement devices of which the respective second portions are mounted to the stage in a non-linear manner to detect location of the holder in a principal direction and in first and second directions orthogonal to the principal direction. The at least three said position-measurement devices provide respective data from which tip, tilt, and yaw of the holder can be determined, for example. The position-measurement device is operable at least during startup of the precision system to provide data concerning the starting position of the holder. By way of example, the precision system is configured as a microlithography system, in which the holder is a stage, such as a substrate stage.

This disclosure is also directed to stages for holding a workpiece relative to a process implement, wherein the stage is movable in a principal direction. An embodiment of such a stage comprises a stage surface to which the workpiece is held, and at least one position-measurement device as summarized above.

This disclosure is also directed to methods for obtaining a measurement of position of an object in a principal direction. An embodiment of such a method comprises splitting a beam of collimated broadband light into a reference beam and a measurement beam. The measurement beam is propagated multiple roundtrip passes in the principal direction from a stationary optical system to a first corner-cube on the object. Meanwhile, the reference beam is propagated in a direction, normal to the principal direction, providing multiple roundtrip passes from the optical system to a stationary second corner cube. After making the roundtrip passes, the reference and measurement beams are recombined and allowed to interfere with each other to produce a coherence envelope. The detected position of the coherence envelope corresponds to the position of the object in the principal direction.

Splitting the collimated broadband light beam can comprise passing the beam of collimated broadband light through a first beamsplitter in the stationary optical system. Meanwhile, the reference and measurement beams are passed through a second beamsplitter in the stationary optical system. The method can further comprise imposing a low-angle tilt to the reference beam relative to the measurement beam before recombining the beams. Meanwhile, the bandwidth of the collimated broadband light desirably is limited before splitting the light.

The foregoing and additional features and advantages of the invention will be more readily understood from the following detailed description, which proceeds with reference to the accompanying drawings.

BRIEF DESCRIPTION OF THE DRAWINGS

FIG. 4A is an elevational view of an embodiment of an interferometer device configured to produce three roundtrip passes of the measurement and reference beams.

FIG. 4C is a perspective view of the device shown in FIGS. 4A and 4B, showing more clearly the three roundtrip passes of the reference and measurement beams.

FIG. 7A is a schematic elevational view of an embodiment in which the optical system includes first and second amplitude beamsplitters used to input two copies each of the reference and measurement beams, wherein these beams are recombined to form two copies of the interference signal delivered to a detector configure as a linear detector array.

FIG. 7B is a top view of the embodiment of FIG. 7A, showing first and second wedges for shifting the first reference beam slightly upward and the second reference beam slightly downward, allowing use of a 2×N linear detector array.

FIG. 7C shows exemplary shifts in the respective coherence envelopes on the linear detector array of the embodiment of FIGS. 7A and 7B.

DETAILED DESCRIPTION

Figure 1:
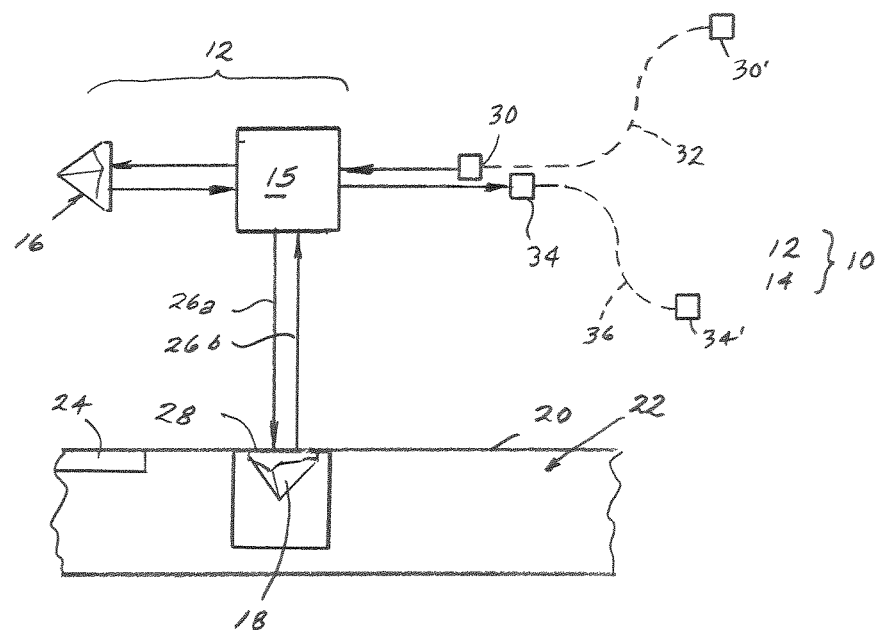
FIG. 1 is an elevational schematic view of an embodiment of the interferometer device as usable with a stage, showing generally the first and second portions of the device.

This disclosure is set forth in the context of representative embodiments that are not intended to be limiting in any way.

The drawings are intended to illustrate the general manner of construction and are not necessarily to scale. In the detailed description and in the drawings themselves, specific illustrative examples are shown and described herein in detail. It will be understood, however, that the drawings and the detailed description are not intended to limit the invention to the particular forms disclosed, but are merely illustrative and intended to teach one of ordinary skill how to make and/or use the invention claimed herein.

As used in this application and in the claims, the singular forms "a," "an," and "the" include the plural forms unless the context clearly dictates otherwise. Additionally, the term "includes" means "comprises." Further, the term "coupled" encompasses mechanical as well as other practical ways of coupling or linking items together, and does not exclude the presence of intermediate elements between the coupled items.

This disclosure is directed toward all novel and non-obvious features and aspects of the various disclosed embodiments, alone and in various combinations and sub-combinations with one another. The disclosed things and methods are not limited to any specific aspect or feature or combinations thereof, nor do the disclosed things and methods require that any one or more specific advantages be present or problems be solved.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed things and methods can be used in conjunction with other things and method. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

Any mention herein of a controller or processor referred to in the singular will be understood to encompass use of multiple controllers or processors.

In the following description, certain terms may be used such as "up," "down,", "upper," "lower," "horizontal," "vertical," "left," "right," and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object.

If a figure includes an orientation system that includes an x-axis, a y-axis that is orthogonal to the x-axis, and a z-axis that is orthogonal to both the x- and y-axes, it should be noted that any of these axes can also be referred to as the first, second, and/or third axes or directions.

The above-stated problem of initializing the position of a stage or other movable object or holder (generally called a "stage" herein) in the z-direction (or other principal direction) during system startup is solved by an interferometer device within the scope of this disclosure. An embodiment of such an interferometer device is a multiple-pass, broadband-light interferometer device that provides accurate positional data, in the principal direction, of the stage even in situations in which the stage is not exactly perpendicular to the incident measurement beam of the interferometer device. The device has no moving parts and provides more accurate initial-position data in the principal direction than conventional position-sensing devices. Although the interferometer devices have particular applicability for use with a substrate stage and/or reticle stage in a microlithographic exposure system, the devices also can be used with stages, holders, and other movable objects (again, generally called a "stage" herein) used in any of various precision systems for holding a workpiece or the like.

In association with the stage, multiple (desirably at least three) interferometer devices mounted in a non-linear manner to the stage can be used to produce, in addition to data regarding stage position in the principal direction, tip and tilt data of the stage relative to the principal direction. Three interferometer devices placed non-linearly can also provide data from which stage position can be determined with respect to all six degrees of freedom, namely z, x, y, $\theta_x$, $\theta_y$, and $\theta_z$, each with a respective accuracy. In any event the position of the stage can be determined as accurately as corresponding relative measurements are obtained and used during servoing the stage and making exposures.

In situations in which the principal direction is the z-direction, since the interferometer devices normally work over a small x/y range, a relatively low-accuracy position sensor can be used for roughly (e.g., within approximately 1 mm) positioning the stage in the x- and y-directions. The detected z-position of the stage, as determined by the interferometer device, can be a "starting position" at which the interferometer device obtains initial stage z-position data.

Figure 2:
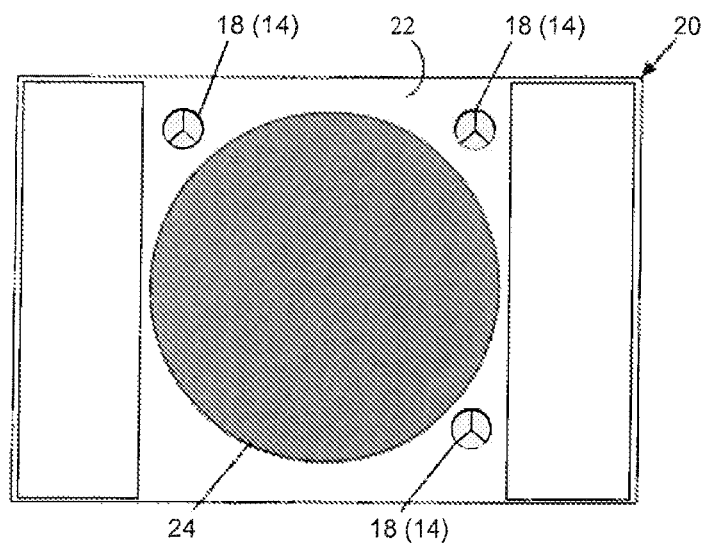
FIG. 2 is a plan view of the upper surface of a substrate stage configured to hold a lithographic substrate ("wafer"), wherein three corner-cubes (of respective interferometer devices have been mounted in a non-linear manner to the substrate stage according to an embodiment.

In FIG. 1 an embodiment of an interferometer device 10 includes a first portion 12 and a second portion 14. The first portion 12 comprises an optical system 15 including a first, or "reference," corner-cube 16 (made of either a transparent glass material or air), and the second portion 14 comprises a second, or "measurement," corner-cube 18 (made of either a transparent glass material or air). The second portion 14 (namely, the measurement corner-cube 18) is mounted on the substrate stage 20. FIG. 2 depicts the substrate stage 20 having three second portions 14 (namely, three measurement corner-cubes 18) mounted on it. The corner-cubes 18 are arranged in a non-linear manner, as shown, at respective locations on the upper surface 22 of the substrate stage 20 (shown holding a wafer 24 as an exemplary substrate). The second portions 14 are mounted such that sensor light enters and departs them along respective trajectories 26a, 26b (FIG. 1) that are normal to the incidence face 28 of the corner-cubes (and hence normal to the upper surface 22 of the substrate stage 20). A set of three measurement corner-cubes 18 mounted in this (or analogous) non-linear arrangement provides accurate determinations of the z-position of the stage 20, as well as determinations of $\theta_x$ and $\theta_y$.

In this embodiment of an interferometer device 10 the first portion 12 is physically detached from (but still optically coupled to) the second portion 14. As discussed later below, the first portion 12 comprises the reference corner-cube 16, the optical system 15 that splits a beam of sensor light from a broadband source 30 into a reference beam and a measurement beam, and a detector 34. The second portion 14 comprises the measurement corner-cube 18. The first portion 12 can include the light source 30. Alternatively, the source can be a remote source 30' optically coupled to the first portion 12 using, for example, an optical fiber 32, wherein the first portion receives a beam of sensor light from the remote source 30'. The optical system 15 also facilitates these beams making multiple passes to and from their respective corner-cubes.

The beam in each pass is substantially normally (perpendicularly) incident on the respective corner-cube. (Exact perpendicularity is not required with corner-cubes.) The detector 34 can be a remote detector 34' optically coupled to the optical system 15 using an optical fiber 36, for example.

The first portion 12 can be enclosed in a respective housing or package, as required, which is desirably mounted on a stable, substantially vibration-free support (not shown) such as the metrology frame of the precision system. The first portion(s) 12 are mounted such that measurement light beams propagate unobstructed from the first portions 12 to the corresponding second portions 14 located on the stage 22. Since the second portions 14 are mounted on the stage 22 in this embodiment, the second portions are movable relative to the respective first portions 12.

Although in this embodiment the interferometer device 10 is located "topside" of the substrate stage 20 (with the measurement corner cube(s) 18 mounted to the upper surface 22 of the substrate stage), this location of the interferometer device is not limiting. In alternative embodiments the interferometer device 10 is located "bottom-side" of the substrate stage 20 (with the measurement corner cube(s) mounted to the lower surface of the substrate stage).

Stage position in the principal direction is measured by the interferometer device using low-coherence interference, which is usable for measurements involving high dynamic ranges. Thus, instead of using fringe phase to determine position, as in monochromatic interferometers, the irradiance maximum of a coherence envelope produced by interference of the beams is used to determine the position of the stage, as well understood in the art. The broader the wavelength spectrum of the source light, the narrower the coherence envelope that is produced. Generally, the narrower the coherence envelope, the more accurately the absolute z-position of the stage can be measured.

Figure 3:
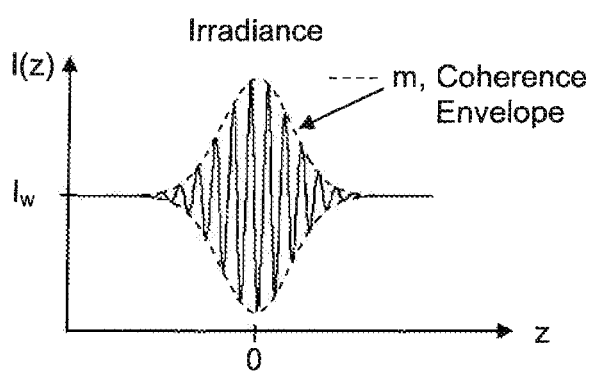
FIG. 3 shows an exemplary coherence envelope produced by various embodiments of the interferometer device.

The "coherence length" ($L_c$) of the light beam from the broadband source is the width (in the principal direction) of the region of coherence for a broadband source; thus, $L_c=\lambda^2/\Delta\lambda$. By way of example, for a 300-nm bandwidth source centered at 600 nm, $L_c=1.2$ µm. FIG. 3 shows an exemplary coherence envelope for the broadband source used in this embodiment. The coherence envelope is the space, within the dashed lines, in which a consequence of coherence (i.e., production of interference fringes) is exhibited. In FIG. 3 the interference fringes are measured and used to determine the modulation. The peak of the modulation (greatest range of $I_w$) corresponds to a desired z-position, which in this case is when the path to the reference corner-cube 16 and the path to the corresponding measurement corner-cube 18 have equal length.

The accuracy with which the center of the coherence envelope can be determined (e.g., to a resolution level of about 5 nm or better as required in modern microlithography systems) is affected at least in part by the path lengths of the reference and measurement beams. By making N traversals of the distance between the optical system 15 and the corner-cubes 16, 18, the sensitivity to position changes is increased by a factor of N. Hence, rather than having these beams make only a single roundtrip, the embodiment produces multiple roundtrip passes of the beams of reference and measurement light to and from their respective corner-cubes 16, 18. More specifically, this embodiment is a three-roundtrip device (i.e., N=3), in which the reference beam and measurement beam each make three roundtrip passes. By way of example, in an embodiment producing three roundtrip passes of the source light to and from respective corner-cubes of the first and second portions, each 1-nm change in stage height translates to (3 passes)×(2 trips/pass)=6 nm displacement of the coherence envelope. In another example, a 5-nm change in substrate-stage z-position ("height") corresponds to a 5×3×2=30 nm shift of position of the center of the coherence envelope. A 30-nm shift of a 1.2-μm wide coherence envelope can be measured accurately. Note that three roundtrip passes are not limiting; a larger number of passes can further increase the measurement resolution, but may require use of larger corner-cubes to prevent coincidence of beams propagating in the corner-cubes.

Each second portion 14 mounted on the substrate stage 22 produces a lateral shift of the outgoing measurement beam 26b relative to the incoming beam 26a. Similarly, each first portion 12 produces a lateral shift of the outgoing and incoming reference beams. These shifts are arranged so that all the passes of the measurement beam 26 enter and exit the measurement corner-cube 18, and all the passes of the reference beam enter and exit the reference corner-cube 16. In cooperation with the optical system 15, these lateral shifts allow the reference and measurement beams to make multiple round trips between the optical system 15 and respective corner-cubes 16, 18.

Use of corner-cubes 18 also ensures that the measurement beams 26b propagating from the stage 22 are parallel to the measurement beams 26a propagating to the stage. Consequently, the stage 22 need not be perfectly aligned in tip/tilt ($\theta_x$, $\theta_y$) when using these interferometer devices 10. This is important because these interferometer devices are usable during stage initialization, as described above.

Figure 4B:
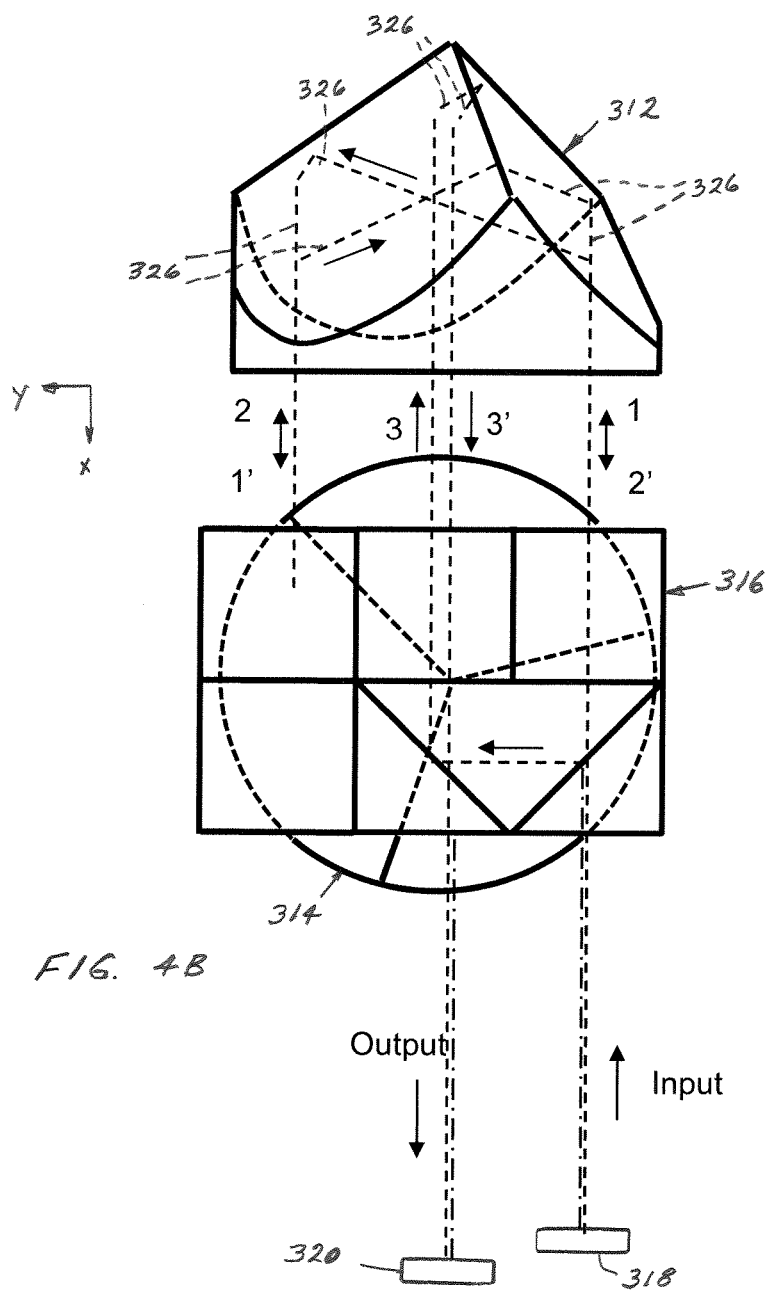
FIG. 4B is an orthogonal top view of the device shown in FIG. 4A.

Elevational, top, and perspective views of an embodiment of an interferometer device 300 are shown in FIGS. 4A, 4B, and 4C, respectively. In FIG. 4B only a reference trace is shown (representing the reference beams). In FIG. 4A, respective reference traces are shown for the reference beams and for the measurement beams. In FIGS. 4A and 4B, exemplary roundtrips of the beams are identified by number (1, 2, 3). More specifically, 1, 2, and 3 denote passes into the corner-cube, and 1', 2', and 3' are passes out of the corner-cube. In FIG. 4A the second portion 304 is mounted to the stage 306, at or beneath the substrate plane ("wafer plane") 308. The second portion 304 comprises a respective corner-cube 314, also called a measurement corner-cube. The incidence surface 310 of the measurement corner-cube 314 can be located on the substrate plane 308. The first portion 302 is located a defined distance above (in the z-direction in this embodiment) the substrate plane 308. The first portion 302 comprises a respective corner-cube 312, also called the reference corner-cube. The first portion 302 also includes an optical system 316 comprising multiple prisms and at least one beamsplitter. In FIG. 4B the first portion 302 can include a source 318 that produces or provides a broadband source beam) and a detector 320 that receives the recombined source and measurement beams. It is advantageous to have the actual source located remotely, wherein the source beam is conducted from the source to the first portion 302 using an optical fiber, for example.

FIG. 4C is a perspective view showing the device 300 of FIGS. 4A and 4B, in which the reference beam and measurement beam make three roundtrips each. Also visible are the corner-cubes 312, 314 and the optical system 316 are visible. The optical system 316 splits the source beam (322; "input") into a measurement beam 324 (- - -) and a reference beam 326 (- - -). The optical system 316 (in cooperation with the reference corner-cube 312) also directs the reference beam 326 to make three roundtrip passes to and from the reference corner-cube 312, and (in cooperation with the measurement corner-cube 314) directs the measurement beam 324 to make three roundtrip passes to and from the measurement corner-cube 314. (Note trips 1, 2, 3 in FIG. 4C.) Hence, the reference beam 326 and the measurement beam 324 each make three roundtrip passes to and from their respective corner-cubes 312, 314. Upon making their final passes, the reference beam 326 and measurement beam 324 are recombined by the optical system 316 into a detector beam 328. As the detector beam 328 propagates to the detector 120, the recombined reference and measurement beams in the detector beam interfere. The resulting interference pattern, in the form of a coherence envelope, is detected by the detector 320.

The detector 320 can be a single-element detector; but, preferably it is a multi-element detector such as (but not limited to) a linear detector array. If a single-element detector is used, then the stage must be scanned in the movement direction (here, the z-direction) to sample the interference pattern in FIG. 3 sufficiently.

Figure 5A:
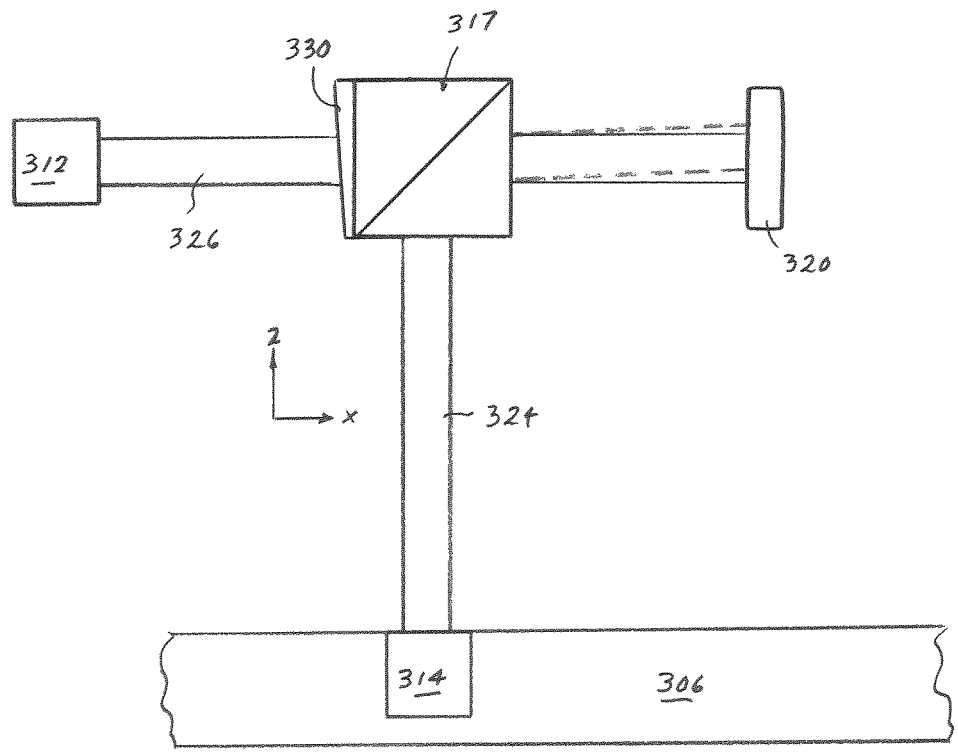
FIG. 5A is a schematic depiction of an embodiment of an interferometer device including a wedge element for imparting a small tilt to the measurement beam before the measurement beam is combined with the reference beam.
Figure 5B:
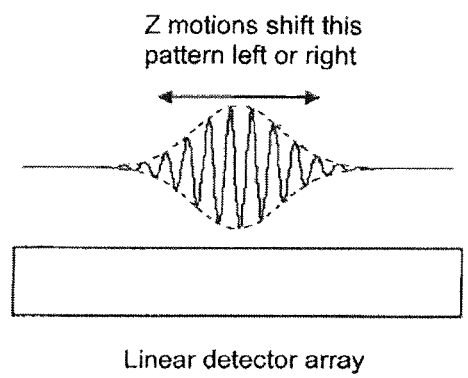
FIG. 5B depicts the manner in which the coherence envelope produced by the embodiment shown in FIG. 5A shifts to the right or left over the linear detector array.

In some embodiments, just before the final-pass reference beam 326 is recombined with the final-pass measurement beam 324, a small tilt is introduced to the reference beam 326 using a wedged glass plate 330, for example, as shown in FIG. 5A. The two beams are then combined using a beamsplitter 317 of the optical system 316, and are incident on the detector 320. If the detector 320 comprises a linear array of detector elements, the tilt and pixel pitch can be configured to create the coherence-envelope (CE) signal shown in FIG. 3 across the detector 320, such that the entire CE shown in FIG. 3 is captured instantaneously, allowing real-time height measurement. As the wafer-stage z-position changes, the CE pattern shifts across the detector 320, as shown in FIG. 5B. The angle of tilt is typically small (approximately much less than 1°), and the wedged plate 330 desirably is made of the same material as the elements of the optical system 316 and the corner-cubes 312, 314. A small-angle wedge 330 produces a relatively wide CE compared to a wedge having a greater angle. The wedge angle is normally set to capture the CE with an appropriate number of pixels, thereby providing a "snapshot" of the entire CE at any moment in time. The enhanced-width CE enhances detector sensitivity, which can provide greater accuracy with which the stage height is determined.

Figure 6A:
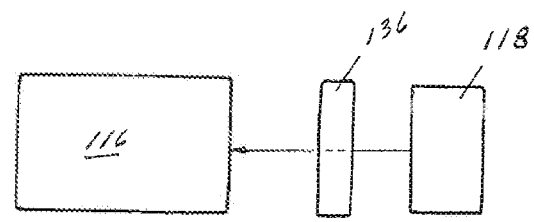
FIG. 6A is a schematic diagram of an embodiment including a chromatic filter located just downstream of the source.
Figure 6B:
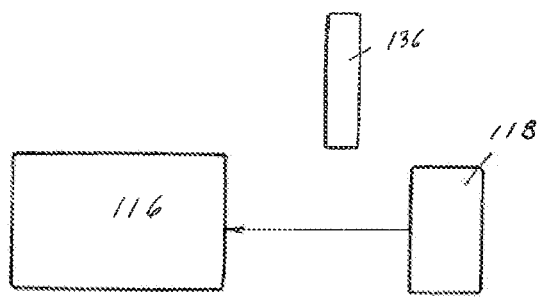
FIG. 6B is a schematic diagram of the embodiment of FIG. 6A in which the chromatic filter has been displaced away from the source beam.

Usually, the tradeoff for high sensitivity is a low dynamic range that in this case would be limited by the size of the linear array in the detector as well as by the wedge angle, since there is no useful signal outside the narrow coherence length of the broadband source. If this is a concern, as shown in FIGS. 6A and 6B, a chromatic filter 336 can be located just downstream of the source 318 and used to reduce the bandwidth of the source temporarily, allowing the width of the coherence envelope CE to be increased to increase the dynamic range of the device. Ideally, the chromatic filter 336 is located upstream of an optical fiber (if used) for delivering source light to the first portion 302, and thus remotely from the first portion. This configuration can be used while driving the stage close to the correct z-position, at which point the filter 336 can be withdrawn or retracted (FIG. 6B) to restore the source 318 to being a broadband source. Hence, moving the filter 336 into and out of position provides switching between higher dynamic range and lower dynamic range, respectively.

Since the interferometer device is typically used only during system initialization, it does not need to be extremely fast. This allows obtained data to be averaged and used for achieving even greater performance.

The application of tilt to the reference beam 326 eliminates the need for any moving parts except for the stage 306 to be positioned and, if desired, the binary motion (either in the beam or out of the beam) of the chromatic filter 336. As is generally known, moving parts can complicate or prevent attainment of measurements having a desired high level of accuracy.

Figure 8:
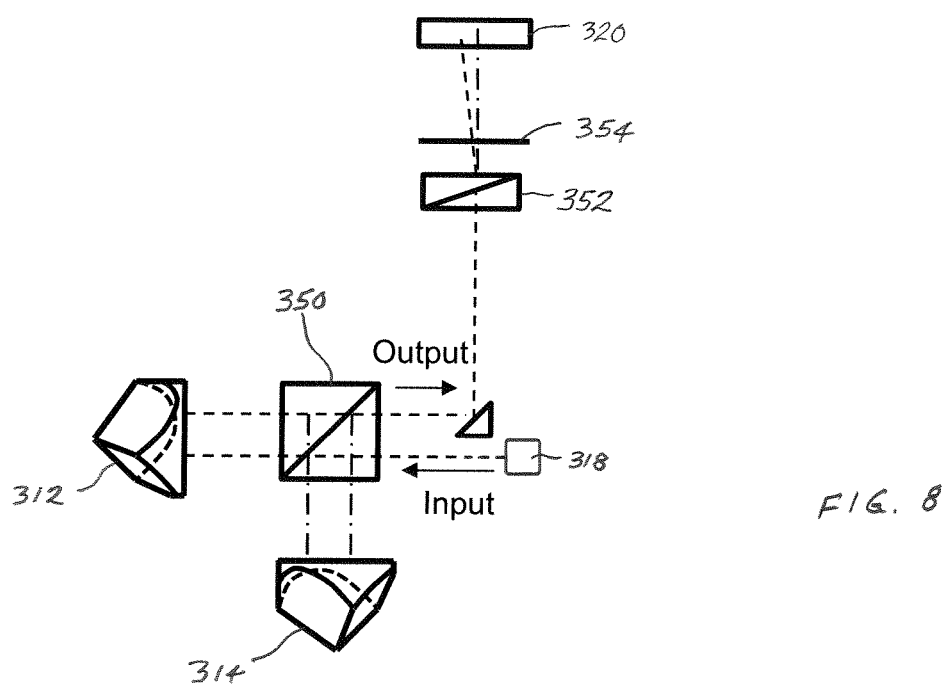
FIG. 8 is a schematic diagram of yet another embodiment in which the optical system comprises polarizing beamsplitters.

In general it is important to maintain a constant temperature in the vicinity of the substrate stage 306, and detector arrays can generate significant amounts of heat. Hence, it may be desirable to position the detector 320 remotely from the substrate stage. If a small wedge is introduced to the reference beams upstream of the amplitude beamsplitter (in the optical system 316) that combines the measurement and reference beams, and the two beams allowed to travel a long distance before being detected, the beams can become physically separated due to "beam walk," which reduces the usable signal. A solution to this issue is as follows (see FIG. 8): If the detector 320 needs to be located remotely from the stage 306, the reference and measurement beams can be created by changing the beamsplitter in the optical system 316 to a polarization beamsplitter (PBS) 350. The small-angle wedge can be removed such that the measurement and reference beams are now recombined at the same polarization beamsplitter and are made to be collinear but of opposite polarizations. These collinear beams can travel a significant distance without exhibiting any "beam walk." Just before the detector 320 a polarization-dependent angle can be introduced between the measurement and reference beams using, for example, a uniaxial crystal 352. Then, a broadband polarizer broadband polarizer 354, oriented between the two linear-polarization states of the measurement and reference beams, is used to project the measurement and reference beams to the same polarization state such that they will interfere and create the CE on the detector 320. Tilt is not desired here because the beams might become misaligned and assume a non-common path on the journey from the optical system 350 to the detector. In any event, this arrangement keeps heat generated by the detector 3230 away from the substrate stage 306. Heat can also be kept away by producing the reference and measurement light beams remotely and conducting them to the optical system 316 using, for example, optical fibers.

From a system point of view, the use of three interferometer devices, arranged as shown in FIG. 1, allows for initialization of the stage 306 in all six degrees of freedom. Z-position of the stage is determined at each of the three interferometer devices as described. It is noted that multiple interferometer devices can be operated using a single source producing a beam that is split for supplying light simultaneously to all the devices (e.g., three), such as by using optical fibers. In any event, differences in the z-position values obtained by the three devices allow initialization of $\theta_x$ and $\theta_y$, tip and tilt of the stage. The greater the separation of the three interferometer devices from each other, the higher the accuracy of $\theta_x$ and $\theta_y$ values that can be obtained.

Since each interferometer device uses a corner-cube, x- or y-shifts of the substrate stage 306 accompanying acquisition of z-position data will shift the position of the measurement beam. The shape of the coherence envelope CE (FIG. 3) will not change during this shifting, but the visibility of the maximum fringe may change. The resulting change in fringe visibility can be used to determine the x- and y-position of the stage 306. This result will be much less accurate than the determined absolute z-position of the stage 306, but it may still be useful for system initialization. For example, a 1-nm x-direction motion of the substrate stage 306 will change the position of the measurement beam by 2 nm, or more, or a fraction of a typical detector pixel. The visibility change in the coherence envelope CE from this motion will be extremely small. However, if the stage 306 moves 100 nm, the measurement beam shifts 200 nm and produces a small but noticeable visibility change.

If the x-position and y-position of the stage 306 are found at three locations on the stage at a positional accuracy on the order of 100 to 200 μm, then rotation of the stage about the z-axis can also be determined, with similar accuracy as the determinations of the x- and y-positions of the stage. Such a system can be used for higher-accuracy initialization of z-position, tip and tilt, and lower-accuracy initialization of x-position, y-position, and $\theta_z$.

By way of example, the interferometer device 300 illustrated in FIGS. 4A-4C uses glass corner-cubes having an input diameter of 14 mm for a 2-mm collimated measurement beam. Under certain conditions this relatively large volume of glass may limit the accuracy of the interferometer device since small temperature differences between the measurement (stage) corner-cubes 314 and the reference corner-cube 312 could introduce a significant change in beam-path length. In a system subject to such changes, it may be beneficial to use air corner-cubes (hollow corner-cubes formed of mirrors) instead of corner-cubes made of glass. A small window can be placed over the top of each air corner-cube to prevent contamination of the reflective surfaces. Stray reflections tend not to be problematic due to the short coherence length (stray light will add incoherently, not coherently, and will not change the measured stage height).

As discussed, a device providing the reference and measurement beams with three round-trip passes can be used to measure z-position of the stage 306, using a low-coherence source. (Note that "low-coherence" does not encompass no coherence; rather the level of coherence is sufficient to produce a detectable coherence envelope.) With this system a 1-nm change in stage position produces a 6-nm shift of the coherence envelope.

It is possible that, in the embodiment shown in FIGS. 4A-4C unwanted motion of the linear detector array may be indistinguishable from motion of the coherence envelope caused by changes in z-position of the stage 306. An embodiment that addresses this issue is depicted in FIGS. 7A-7C. In the optical system 316, using amplitude beamsplitters, two copies of the reference and measurement beams are input to the beamsplitter A, displaced in, for example, the y-direction (FIG. 7A). These beams recombine as described above to create two copies of the interference signal. The paths are matched for either of the interferometers, as described above. As shown in FIG. 7B, a separate wedge ("wedge 1" and "wedge 2"; see wedge 330 in FIG. 5A) is used for each of the two interferometer signals. The two wedges have the same wedge angle, but are oriented oppositely such that wedge 1 refracts the first reference beam slightly upward while wedge 2 refracts the second reference beam slightly downward, for example. The shifted reference beams then interfere with the two respective measurement beams after being combined in beamsplitter A. A similar method can be used with two similar uniaxial crystals for the case where the detector array is located far away from the optical system 116, as described above, and optically coupled to the optical system using, for example, an optical fiber.

In the embodiment of FIGS. 7A-7B, instead of a 1×n linear detector, a 2×n (double linear array) detector can be used, wherein one coherence-envelope signal falls on the upper linear array and the other coherence-envelope signal falls on the lower linear array, as shown in FIG. 7C. The signal from wedge 1 will shift to the right in FIG. 7C in response to +z-motions of the stage, as described above. However, since the signal from wedge 2 has its tilt oriented in the opposite direction, its coherence envelope will shift to the left in FIG. 7C in response to +z-motions of the stage. Thus, the coherence envelope of the signal from wedge 2 moves oppositely to the coherence envelope from wedge 1. The absolute z-location of the stage is determined by finding the separation between the two coherence envelopes. In contrast, the embodiments described earlier above determine stage position by finding the location of a single coherence envelope relative to the detector pixels.

A first advantageous consequence of the opposing shifts of interferometer signal produced by this embodiment is that a shift of the detector does not appear as a possible motion of the stage, since detection of stage position is based on the separation of the two signals, not their absolute positions. This allows the detector to be located more remotely from the stage, with a possibly reduced constraint on mounting stability.

A second consequence is that the measurement sensitivity of the z-position of the stage is improved. For example, in the previously described embodiment, a 1-nm motion of the stage moved the coherence envelope 6 nm. In the embodiment of FIGS. 7A-7C, the CE of the signal from wedge 1 moves in response to a 6-nm change in the z-direction to the right while the CE of the signal from wedge 2 moves in response to a 6-nm change in the z-direction to the left. Thus, the two CEs are separated by the equivalent of a 12-nm shift for a 1-nm physical shift of the stage. Since the leading source of noise for this system will likely be the ability to find the center of the coherence envelope, performing the two measurements instead of one yields an improvement factor of $(2)^{1/2}$, which still represents an improvement compared to $(1)^{1/2}$.

Regarding the wedge angle, consider a detector with 600 pixels, each being 10-μm wide, and a tilt angle between beams of about 2 mrad or 0.115 degree (a small angle in which dispersion of the broadband light would be negligible). The wedge angle of the prism required to obtain this reference beam tilt can be determined from Snell's law, assuming a refractive index of 1.5 to correspond roughly to 4 mrad, or 0.23 degrees. For this example, the total path difference between the two ends of the linear detector is given by (600 pix)(6 μm/pix)(tan(2 mrad))=12 μm. Therefore, each pixel is 12 μm/600=20 nm of path difference, or 20/6=3.33 nm of stage height per pixel shift of the CE. To measure a 1-nm motion of the stage, the separation of the two envelopes would be found: (12-nm envelope separation)/(2 nm/pixel)=0.6 pixels. Assuming a 1.2-μm coherence length, the CE width would be roughly 100 pixels, so the envelope center would need to be found at 0.6/100, or 0.6%, which is quite reasonable. The full width of the detector (600 pix×2 nm/pix=1200 nm) corresponds to about 10-times the width of the CE for the earlier example coherence length of 1.2 μm.

In general, the various embodiments of the z-sensing interferometer device have relatively high accuracy and allow initialization of the wafer stage in 6 DOF (three with high accuracy). There are no moving parts that must be monitored with a high-accuracy encoder, for example, or that can drift and cause measurement error. Also, the optics are relatively simple.

Included in this disclosure are any of various precision systems comprising a stage or the like that holds a workpiece or other item useful in a manufacture, relative to an axis, and that determines location of the stage at high accuracy and precision using devices and methods as described above. An example of a precision system is a microlithography system or exposure "tool" used for manufacturing semiconductor devices. A schematic depiction of an exemplary microlithography system 110, comprising features as described above, is provided in FIG. 9. The system 110 includes a system frame 112, an illumination system 114, an imaging-optical system 116, a reticle-stage assembly 118, a substrate-stage assembly 120, a positioning system 122, and a system-controller 124. The configuration of the components of the system 110 is particularly useful for transferring a pattern (not shown) of an integrated circuit from a reticle 126 onto a semiconductor wafer 128. The system 110 mounts to a mounting base 130, e.g., the ground, a base, or floor or other supporting structure. A position-measurement device 122A measures the position of the substrate (as an exemplary workpiece) along an axis (e.g., the z-axis or optical axis).

There are various types of microlithographic systems. For example, the depicted system 110 can be used as a scanning type photolithography system. Alternatively, the exposure system 110 can be a step-and-repeat type microlithography system. However, the use of the exposure system 110 is not limited to a photolithography system for semiconductor manufacturing. The exposure system 110 can be used as, for example, an LCD photolithography system that exposes a liquid-crystal display device pattern onto a rectangular glass plate, or as a photolithography system for manufacturing thin-film magnetic heads.

The system frame 112 is rigid and supports the components of the exposure system 110. The system frame 112 shown in FIG. 9 supports the reticle-stage assembly 118, the optical assembly 116, the substrate-stage assembly 20, and the illumination system 114 above the mounting base 130.

The illumination system 114 includes an illumination source 132 and an illumination-optical assembly 134. The illumination source 132 emits a beam (irradiation) of light energy. The illumination-optical assembly 134 guides the beam of light energy from the illumination source 132 to the optical assembly 116. The illumination source 132 can be a mercury-lamp g-line source (436 nm), a mercury-lamp i-line source (365 nm), a KrF excimer laser (248 nm), an ArF excimer laser (193 nm), an $F_2$ laser (157 nm), an EUV source (13.5 nm), or an x-ray source. Alternatively, the illumination source 132 can generate a charged particle beam such as an electron beam.

The optical assembly 116 projects and/or focuses light leaving the reticle 126 to the wafer 128. Depending upon the configuration of the exposure system, the optical assembly 116 can magnify or reduce the image illuminated on the reticle 126.

Figure 9:
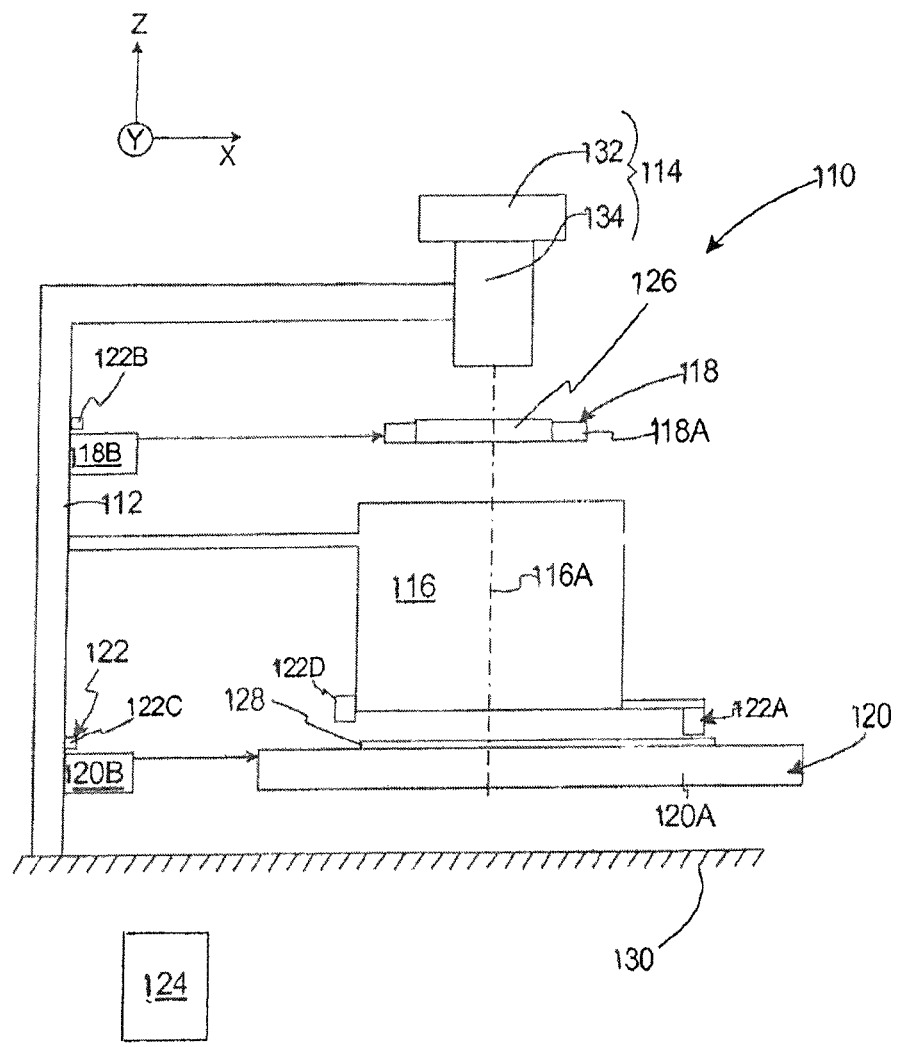
FIG. 9 is a schematic diagram of a microlithographic exposure system, as a representative precision system, including features of the invention described herein.

The reticle-stage assembly 118 holds and positions the reticle 126 relative to the optical assembly 116 and to the substrate wafer 128. In FIG. 9 the reticle-stage assembly 1118 includes a reticle stage 118A that retains the reticle 126, and a reticle-stage mover assembly 118B that positions the reticle stage 118A and the reticle 126. The reticle-stage mover assembly 118B can be configured to move the reticle 126 along the x-, y-, and z-axes, and about the x-, y-, and z-axes.

Somewhat similarly, the substrate-stage assembly 120 holds and positions the substrate 128 relative to the projected image of the illuminated portions of the reticle 126. In FIG. 9 the substrate-stage assembly 210 includes a substrate stage 120A that retains the substrate 128, and a substrate-stage mover assembly 120B that positions the substrate stage 120A and the substrate 128. The substrate-stage mover assembly can be configured to move the substrate 128 along the x-, y-, and/or z-axes, and about the x-, y-, and z-axes.

The positioning system 122 monitors movement of the reticle 126 and the substrate 128 relative to the optical assembly 116 or other reference. With this information the apparatus-control system 124 can control the reticle-stage assembly 118 to precisely position the reticle 126 and the substrate-stage assembly 120 to precisely position the substrate 128. For example, the positioning system 122 can utilize multiple laser interferometers, encoders, autofocus systems, and/or other measuring devices.

In FIG. 9 the positioning system 122 includes: (i) a reticle-measurement system 122B (that monitors the position of the reticle stage 118B and the reticle 126), (ii) a substrate-measurement system 122B that monitors the position of the substrate stage 120A along the x- and y-axes, and about the z-axis, and (iii) a device 122A that monitors the position of the substrate 128 relative to the optical assembly 116 along an optical axis 116A (e.g., the z-axis). In certain embodiments the positioning system 122 can include an autofocus system 122D that monitors the position of the substrate 128 relative to the optical assembly 116 along the z-axis (the optical axis 116A), about the x-axis, and about the y-axis. In one non-exclusive embodiment, the device 122A is used in conjunction with the autofocus system 122D to calibrate the autofocus system 122D prior to processing (e.g., transferring images to) the wafer 128 to improve the accuracy of the autofocus system 122D.

The apparatus-control system 124 is connected to the reticle-stage assembly 118, the substrate-stage assembly 120, and the positioning system 122. The apparatus-control system 124 receives information from the positioning system 122 and controls the stage assemblies 118, 120 to precisely position the reticle 126 and the wafer 128. The apparatus control system 124 can includes one or more processors and circuits.

In the foregoing embodiments, the first portion 12 of the interferometer device is located topside of the substrate stage 120. However, in an alternative embodiment the first portion 12 is located bottom-side of the substrate stage 120. In the alternative embodiment the second portion 14 (i.e., the measurement corner-cube) may also be located bottom-side of the substrate stage 120.

Figure 10:
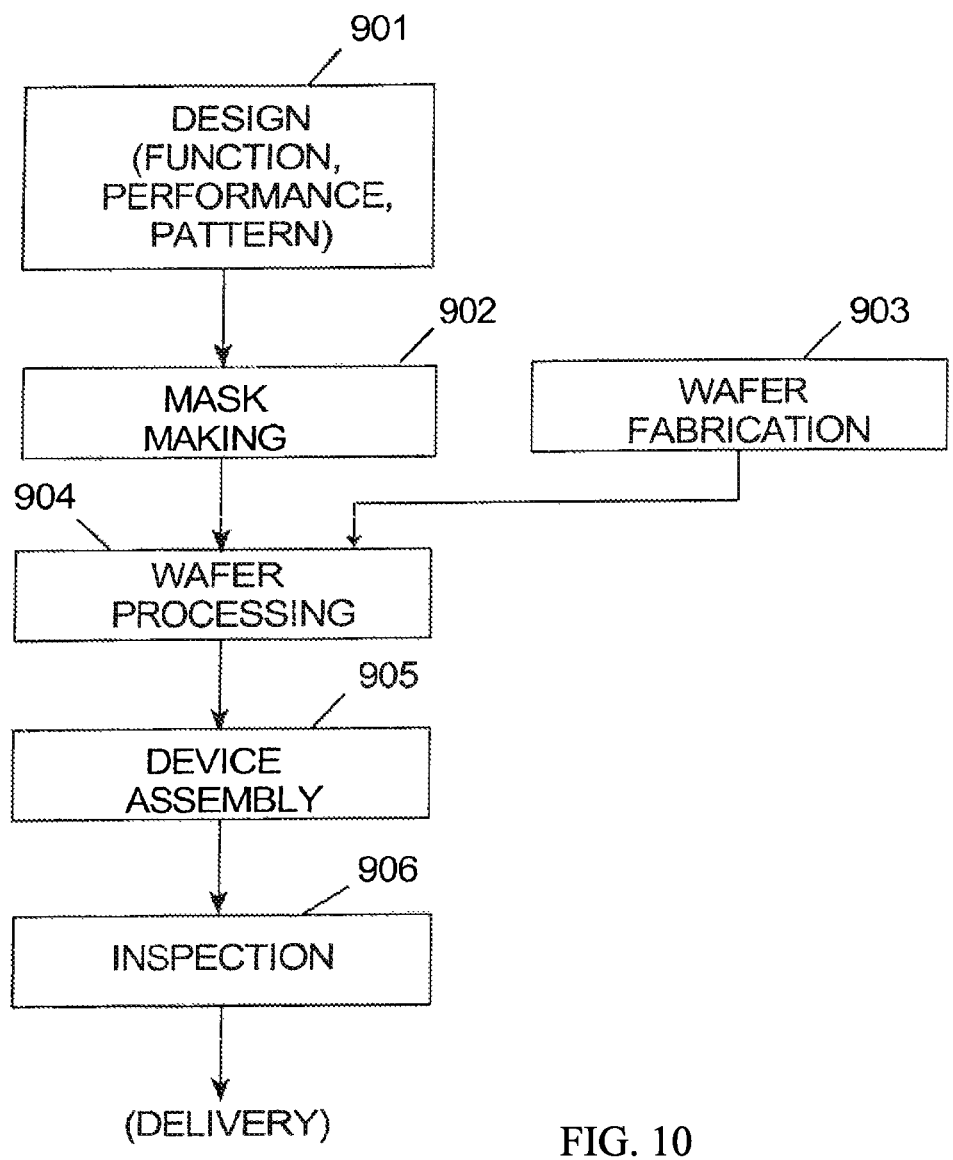
FIG. 10 is a flow-chart outlining a process for manufacturing a semiconductor device in accordance with the invention.

An exemplary process for manufacturing semiconductor devices, including an exposure step, is shown in FIG. 10. In step 901 the device's function and performance characteristics are designed. Next, in step 902, a mask (reticle) having a desired pattern is designed according to the previous designing step, and in a parallel step 903 a wafer is made from a suitable semiconductor material. The mask pattern designed in step 902 is exposed onto the wafer from step 903 in step 904 by a microlithography system described herein in accordance with the present invention. In step 905 the semiconductor device is assembled (including the dicing process, bonding process, and packaging process. Finally, the device is inspected in step 906.

Figure 11:
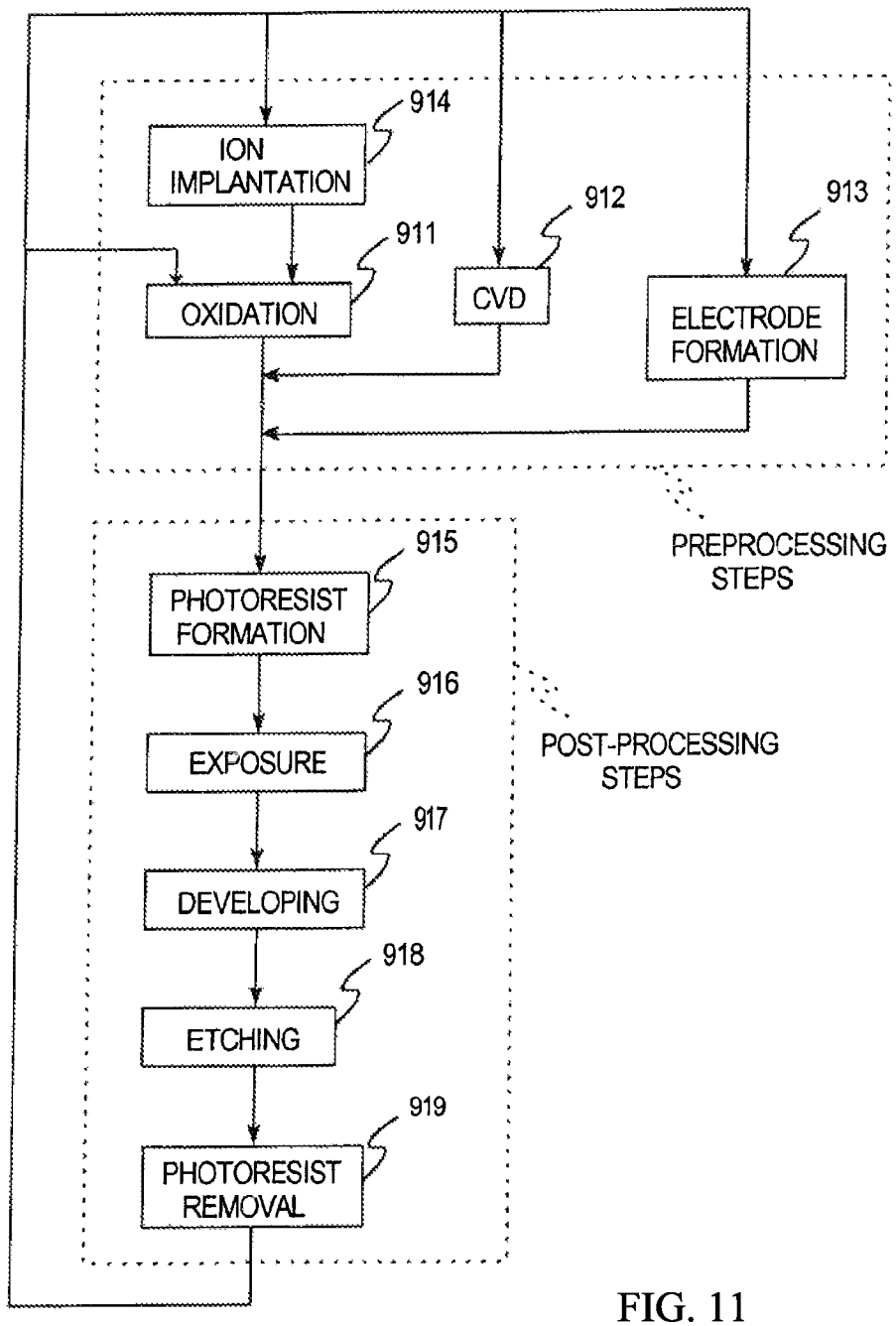
FIG. 11 is a flow-chart of a portion of a device-manufacturing process in more detail.

FIG. 11 is a flowchart of the above-mentioned step 904 in the case of fabricating semiconductor devices. In FIG. 11, in step 911 (oxidation step), the wafer surface is oxidized. In step 912 (CVD step), an insulation film is formed on the wafer surface. In step 913 (electrode-formation step), electrodes are formed on the wafer by vapor deposition. In step 914 (ion-implantation step), ions are implanted in the wafer. The above-mentioned steps 911-914 constitute the preprocessing steps for wafers during wafer processing, and selection is made at each step according to processing requirements.

At each stage of wafer-processing, when the above-mentioned preprocessing steps have been completed, the following "post-processing" steps are implemented. During post-processing, first, in step 915 (photoresist-formation step), photoresist is applied to a wafer. Next, in step 916 (exposure step), the above-mentioned exposure device is used to transfer the circuit pattern of a mask (reticle) to a wafer. Then, in step 917 (developing step), the exposed wafer is developed, and in step 918 (etching step), parts other than residual photoresist (exposed material surface) are removed by etching. In step 919 (photoresist-removal step), unnecessary photoresist remaining after etching is removed. Multiple circuit patterns are formed by repeating these pre-processing and post-processing steps.

It will be understood that the interferometer devices as disclosed herein are merely illustrative of the currently preferred embodiments, and that no limitations are intended to impact the details of construction or design herein shown, other than as described. It will also be understood that the subject interferometer devices are not limited to determining the initial position of a stage for a lithographic substrate. For example, the interferometer devices can be used for determining the initial position of a reticle stage.

Whereas the invention has been described in connection with representative embodiments, it will be understood that it is not limited to those embodiments. On the contrary, it is intended to encompass all alternatives, modifications, and equivalents as may be included within the spirit and scope of the invention as defined by the appended claims.

What is claimed is:

1. A position-measurement device, comprising:
 a first portion comprising a first corner-cube and an optical system including a beamsplitter and a multi-element light detector comprising an array of detector elements that define a light detection plane; and
 a second portion that is movable relative to the first portion, the second portion comprising a second corner-cube mountable on an object that is displaceable in a principal direction relative to the first portion, the beamsplitter splitting a beam of collimated broadband light into a reference beam and a measurement beam that are directed by the optical system to make respective multiple roundtrip passes from the optical system to the respective corner cubes and back and that interfere with each other to produce a coherence envelope sensed by the multi-element light detector, wherein a detected displacement of the coherence envelope in the light detection plane corresponds to a respective position of the object in the principal direction.

2. The device of claim 1, wherein the first portion further comprises a source of the beam of collimated broadband light.

3. The device of claim 1, wherein:
 the optical system directs the reference beam to make multiple roundtrip passes in a first direction;
 the optical system directs the measurement beam to make multiple roundtrip passes in a second direction that is orthogonal to the first direction; and
 the principal direction is the second orthogonal direction.

4. The device of claim 3, wherein the first orthogonal direction is an x- or y-direction, and the second orthogonal direction is a z-direction.

5. The device of claim 3, wherein detected displacement of an irradiance maximum of the coherence envelope corresponds to a measurement of location of the object in the second orthogonal direction.

6. The device of claim 1, wherein the reference and measurement beams exhibit low-coherence interference to produce the coherence envelope.

7. The device of claim 1, wherein the reference and measurement beams each make three roundtrips to and from the first and second corner-cubes, respectively.

8. The device of claim 1, wherein the reference beam is normally incident on the first corner-cube, and the measurement beam is normally incident on the second corner-cube.

9. The device of claim 1, wherein the coherence envelope has a Gaussian profile.

10. The device of claim 1, wherein the detector senses position of the object by determining position of an irradiance maximum of the coherence envelope.

11. The device of claim 1, wherein the corner-cubes provide the reference and measurement beams with substantially equal glass and air paths.

12. The device of claim 1, wherein the optical system further comprises a beam-tilting optical element located to impose a respective tilt to the reference beam relative to the measurement beam before the beams are recombined.

13. The device of claim 1, wherein displacement of the coherence envelope on the detector is in a direction normal to the z-direction.

14. The device of claim 1, wherein:
the light source comprises a chromatic filter by which bandwidth of the light from the source is adjusted; and
the chromatic filter is mounted to be inserted into and retracted from the beam produced by the source to change dynamic range of the beam as desired.

15. The device of claim 1, wherein the optical system further comprises a respective amplitude beamsplitter for each of the reference and measurement beams returning to the optical system for recombining, the amplitude beamsplitters splitting the respective beam into respective first and second portions.

16. The device of claim 15, wherein the optical system further comprises first and second wedges situated to refract the first portion of the reference beam in a first direction and to refract the second portion of the reference beam in a second direction opposite the first direction.

17. The device of claim 16, wherein:
the light detector comprises a double linear array of detector elements; and
a coherence envelope produced by interference involving the first portion of the reference beam is detected by one linear array, and the coherence envelope produced by interference involving the second portion of the reference beam is detected by the other linear array.

18. The device of claim 17, wherein position of the object is a function of separation of the coherence envelopes from each other on the detector.

19. An interferometer device, comprising:
a stationary portion comprising a first corner-cube, an optical system including a beamsplitter, and a multi-element light detector comprising an array of detector elements that define a light detection plane; and
a movable portion comprising a second corner-cube mountable on an object that is displaceable in a direction relative to the first portion, the beamsplitter splitting a beam of collimated broadband light into a reference beam and a measurement beam that are directed by the optical system to make multiple roundtrip passes from the optical system to the respective corner cubes and back and that interfere with each other to produce a coherence envelope sensed by the multi-element light detector, wherein a detected displacement of the coherence envelope in the light detection plane corresponds to a respective position of the object.

20. A precision system, comprising:
a stage movable in at least one movement direction; and
at least one position-measurement device detecting position of the stage in the movement direction, the position-measurement device comprising a stationary portion and a movable portion, the stationary portion comprising a first corner-cube, an optical system including a beamsplitter, and a multi-element light detector comprising an array of detector elements that define a light detection plane, and the movable portion being movable with the stage and comprising a second corner-cube, the beamsplitter splitting a beam of collimated broadband light into a reference beam and a measurement beam that are directed by the optical system to make multiple roundtrip passes from the optical system to the respective corner cubes and back and that interfere with each other to produce a coherence envelope sensed by the multi-element light detector, wherein a detected displacement of the coherence envelope in the light detection plane corresponds to a respective position of the stage.

21. The precision system of claim 20, wherein:
the measurement beam makes multiple roundtrip passes in the movement direction; and
the reference beam makes corresponding multiple roundtrip passes in a direction normal to the principal direction.

22. The precision system of claim 21, comprising at least three said position-measurement devices of which the respective second portions are mounted to the stage in a non-linear manner to detect location of the stage in a principal direction and in first and second directions orthogonal to the principal direction.

23. The precision system of claim 22, wherein the at least three said position-measurement devices provide respective data from which tip, tilt, and yaw of the stage can be determined.

24. The precision system of claim 20, operable at least during startup of the precision system.

25. The precision system of claim 20, configured as a microlithography system.

26. A stage for holding a workpiece relative to a process implement and movable in a principal direction, the stage comprising:
a stage surface to which the workpiece is held; and
at least one position-measurement device detecting position of the stage in the principal direction, the position-measurement device comprising a stationary portion and a movable portion, the stationary portion comprising a first corner-cube, an optical system including a beamsplitter, and a multi-element light detector comprising an array of detector elements that define a light detection plane, and the movable portion being movable with the stage and comprising a second corner-cube, the beamsplitter splitting a beam of collimated broadband light into a reference beam and a measurement beam that are directed by the optical system to make multiple roundtrip passes from the optical system to the respective corner cubes and back and that interfere with each other to produce a coherence envelope sensed by the multi-element light detector, wherein a detected displacement of the coherence envelope in the light detection plane corresponds to a respective position of the stage.

27. A method for obtaining a measurement of position of an object in a principal direction, comprising:
splitting a beam of collimated broadband light into a reference beam and a measurement beam;
propagating the measurement beam multiple roundtrip passes in the principal direction from a stationary optical system to a first corner-cube on the object;

propagating the reference beam in a direction, normal to the principal direction, multiple roundtrip passes from the stationary optical system to a stationary second corner cube;

after making the roundtrip passes, recombining the reference and measurement beams to produce a coherence envelope; and in a light detection plane defined by an array of detector elements, detecting a position of the coherence envelope corresponding to the position of the object in the principal direction.

28. The method of claim 27, wherein:

splitting the collimated broadband light beam comprises passing the beam of collimated broadband light through a first beamsplitter in the stationary optical system; and recombining the reference and measurement beams comprises passing the beams through a second beamsplitter in the stationary optical system.

29. The method of claim 27, further comprising imposing a low-angle tilt to the reference beam relative to the measurement beam before recombining the beams.

30. The method of claim 27, further comprising limiting a bandwidth of the collimated broadband light before splitting the broadband light.

31. The method of claim 27, further comprising:

splitting the reference and measurement beams before recombining the beams, so as to form first and second portions of the reference beam and first and second portions of the measurement beam; and refracting the first and second portions of the reference beam in mutually opposite directions and the first and second portions of the measurement beam in mutually opposite directions corresponding to the mutually opposite directions of the first and second portions of the reference beam; and simultaneously detecting interference of the first portions and interference of the second portions and first and second coherence envelopes.

32. The method of clam 31, wherein position of the object corresponds to a lateral distance between the first and second coherence envelopes as detected.

33. In a process tool, a method for moving an object, comprising:

determining an initial position of the object;

moving the object in at least a principal direction; and using the initial position as a reference, determining a subsequent position of the object, wherein the initial position is determined by a method as recited in claim 28.

34. The method of claim 33, performed at least during a startup of the process tool.

35. The method of claim 33, wherein the principal direction is a height direction.

* * * * *